US006768713B1

(12) United States Patent
Siala et al.

(10) Patent No.: US 6,768,713 B1
(45) Date of Patent: Jul. 27, 2004

(54) ORTHOGONAL FREQUENCY DIVISION MULTIPLEXING RECEIVER WITH ITERATIVE CHANNEL ESTIMATION AND A CORRESPONDING METHOD

(75) Inventors: Mohamed Siala, Clamart (FR); Emmanuel Jaffrot, Paris (FR)

(73) Assignee: France Telecom, Paris (FR)

( * ) Notice: Subject to any disclaimer, the term of this patent is extended or adjusted under 35 U.S.C. 154(b) by 743 days.

(21) Appl. No.: 09/660,202

(22) Filed: Sep. 12, 2000

(30) Foreign Application Priority Data

Sep. 13, 1999 (FR) .............................................. 99 11415

(51) Int. Cl.[7] ................................................ H04J 11/00

(52) U.S. Cl. ....................................... 370/203; 370/210

(58) Field of Search ................................. 375/316–352, 375/136, 142, 148, 285, 354, 355, 365, 366; 455/226.1–4, 500, 132; 708/403; 370/203–211, 514, 343, 310, 315, 480, 492, 913; 339/338, 339, 398

(56) References Cited

U.S. PATENT DOCUMENTS

| | | | | | |
|---|---|---|---|---|---|
| 5,548,582 | A | * | 8/1996 | Brajal et al. ................. | 370/206 |
| 5,687,165 | A | * | 11/1997 | Daffara et al. ............... | 370/208 |
| 5,982,327 | A | * | 11/1999 | Vook et al. .................. | 342/380 |
| 6,061,327 | A | * | 5/2000 | Demoulin et al. ........... | 370/208 |
| 6,188,717 | B1 | * | 2/2001 | Kaiser et al. ............... | 375/148 |
| 6,327,314 | B1 | * | 12/2001 | Cimini et al. ............... | 375/340 |
| 6,400,776 | B1 | * | 6/2002 | Matthews .................... | 375/298 |
| 6,452,981 | B1 | * | 9/2002 | Raleigh et al. ............. | 375/299 |
| 6,456,654 | B1 | * | 9/2002 | Ginesi et al. ............... | 375/229 |
| 6,473,393 | B1 | * | 10/2002 | Ariyavisitakul et al. .... | 370/203 |
| 6,628,638 | B1 | * | 9/2003 | Sato et al. ................... | 370/343 |

OTHER PUBLICATIONS

Mohamed Siala, et al., Annals des Telecommunications, vol. 54, No. 3–4, pp. 243–254, "Iterative Rake Receiver with MAP channel estimation for ds–cdma systems", Mar. 1999.*
Said et al, Linear two dimensinonal pilot assited channel estimation of OFDM systems, Apr. 1998, IEEE, No. 451, 32–36.*
Garcia et al, Efficient pilot patterns for channel estimation in OFDM systems over HF cahnnels, Apr. 1999, IEEE, 7803–5435, 2193–2196.*
Teich et al, Iterative Detection Algorithm for extended MC–CDMA, Apr. 1998, IEEE, 7803–4281, 184–188.*
Luciano Tomba, et al., IEICE Transactions on Communications, vol. E79–B, No. 9, pp. 1351–1360, "Downlink Detection Schemes for MC–CDMA Systems in Indoor Environments", Sep. 1996.

(List continued on next page.)

*Primary Examiner*—Kenneth Vanderpuye
*Assistant Examiner*—Ian Moore
(74) *Attorney, Agent, or Firm*—Oblon, Spivak, McClelland, Maier & Neustadt, P.C.

(57) ABSTRACT

An Orthogonal Frequency Division Multiplexing reception method and receiver for receiving a signal representing data symbols through a plurality of channels and for supplying an estimation of the data symbols. The receiver includes a plurality of branches of diversity processing blocks. Each block includes data and pilot symbols distributed within a bi-dimensional time-frequency block. The receiver includes a channel estimator which receives the output signals supplied from the various branches of diversity, and provides a flexible estimation of the data symbols. The channel estimator processes a finite number of iterations in accordance with an expectation-maximization algorithm taking into consideration the pilot symbols of a bi-dimensional time-frequency block, and the pilot and precedent flexible data symbols estimated for following iterations until the finite number of iterations is reached. After the final iteration, the estimator supplies an estimated channel that is optimized by the iterative algorithm.

18 Claims, 8 Drawing Sheets

OTHER PUBLICATIONS

Mohamed Siala, et al., Annales des Telecommunications, vol. 54, No. 3–4, pp. 243–254, "Iterative Rake Receiver with Map Channel Estimation for DS–CDMA Systems", 1999.

Fredrik Tufvesson, et al., IEEE Vehicular Technology Conference, vol. 3, pp. 1639–1643, "Pilot Assisted Channel Estimation for OFDM in Mobile Cellular Systems", May 4, 1997.

J.G. Proakis, Digital Communications, pp. 777–780, "Diversity Techniques for Fading Multipath Channels", 1995.

* cited by examiner $V_1$ $V_2$ $V_3$ $V_4$ $V_5$ $V_6$ $V_7$ $V_8$ $V_9$

ORTHOGONAL FREQUENCY DIVISION MULTIPLEXING RECEIVER WITH ITERATIVE CHANNEL ESTIMATION AND A CORRESPONDING METHOD

TECHNOLOGICAL FIELD

The subject of this invention is an orthogonal frequency division multiplexing receiver with iterative channel estimation and a corresponding method. It finds application in radio communications and more particularly in Orthogonal Frequency Division Multiplexing or OFDM technology. It may be applied to—among other systems—the European portable radio system HIPERLAN II.

STATE OF THE PRIOR ART

OFDM technology [1] is a multi-carrier technology which permits division of users within a time-frequency plane in a simple way. In addition it permits the transmission of signals at a high rate without having to use an equalizer. This method has been widely used in the context of Digital Video Broadcasting or DVB-T, [2] and Digital Audio Broadcasting or DAB [3]. In a portable radio context, OFDM is present in the HIPERLAN II Standard.

OFDM technology is both a multiple access technology and a modulation technology. The basic principle of OFDM technology is to produce a certain number of narrow band signals all orthogonal to one another. By taking using precautions, these properties of orthogonality are used to recover the transmitted data. The creation of such a system calls upon the use of an inverse Fourier transform on emission and a Fourier transform on reception.

FIG. 1 appended illustrates a traditional OFDM transmission chain with a single sensor. This chain, comprises a serial to parallel conversion circuit 10 receiving symbols A, an inverse Fourier transform circuit 12, transmission means 14, reception means 20, a Fourier transform circuit 22, a parallel to serial converter 24 and finally a decision means 26 which reconstructs the estimated symbols Â.

The traditional OFDM transmitter processes the flow of data by block. It manages this flow by sequences of $N_t$ symbols and carries out the inverse Fourier transform on them. This means that the inverse Fourier transform produces $N_f$ sub-carriers, each carrying one of the symbols of the starting sequence. This block, called an OFDM symbol, contains the data symbols and may also contain pilot symbols which can be used for purposes of synchronization or of channel estimation. In contrast to the case of Code Division Multiple Access or CDMA signals or Time Division Multiple Access or TDMA signals, where one pilot symbol right away occupies the whole of the transmission band, OFDM technology requires the true distribution of the pilot symbols over the whole of the time-frequency plane.

The mobile radio channel taken when there is communication between a transmitter and a receiver is generally of the multi-path type with rapid Rayleigh fading. This phenomenon is due to the conjunction of the movement of the mobile and the propagation of the radio wave along several paths.

The receiver processes the signal received through an OFDM block of symbols (a time-frequency block). The signal is received on a network of L sensors, creating L branches of diversity. The channel estimation is carried out on each of these branches and the results are combined by Maximum Ratio Combining (MRC) to finally estimate the transmitted data.

A receiver with L branches of diversity is shown in FIG. 2. It comprises L sensors $30_1, 30_2, \ldots, 30_L$, L Fourier transform circuits $32_1, 32_2, \ldots, 32_L$, L parallel to serial converters $34_1, 34_2, \ldots, 34_L$, L channel estimation circuits $36_1, 36_2, \ldots, 36_L$, and an adder 38 supplying the estimated symbols Â.

From the point of view of the receiver, after demodulation, the channel allocating a time-frequency block can be shown in the form of a time-frequency matrix, or a surface in time-frequency-amplitude space. However the problem is processed in bi-dimensional space, in contrast to TDMA [4] where the problem is uni-dimensional.

The channel estimation is based on the use of pilot symbols. They enable a channel estimation to be provided directly to the locations of the pilots with a view to interpolation in order to estimate the channel allocating the rest of the symbols.

These techniques have disadvantages. In effect, the channel seen by the receiver can vary in a significant manner from one time-frequency block to another. This variation is mainly due to changes in propagation conditions between the transmitter and the receiver. From a physical point of view, the variable character of the channel can be characterized by the product $B_d \times T_m$ where $B_d$ represents the width of the Doppler band and $T_m$ the spread of the delays. The greater the product $B_d \times T_m$, the more the channel varies rapidly within the time and frequency domains.

The reception method of the prior art does not seek to optimize the channel estimation. They are content to carry out an estimation of the channel at the positions of the pilot symbols and then to extend this estimation to the data by interpolation. The interpolations are generally carried out in a linear manner. Three of the methods most commonly used may be described:

The first considers the three pilot symbols closest to the symbol at which one wishes to estimate the channel. The plane passing through the three pilot symbols is calculated and from this the channel is deduced at the point being considered. Even by respecting the Nyquist criterion with respect to the pilot symbols, that is to say, using sufficient pilot symbols and distributing them in a manner that correctly samples the time-frequency plane, this method is sensitive to strong channel variations and does not allow one to carry, out a reliable estimation of the channel, especially in the case where the product $B_d \times T_m$ is high.

The second method is a simple form of the Minimum Mean Square Error (MMSE) technique: it consists of looking for the constant plane that averages the values of the channel at the pilot 'symbols and of deducing from it the values of the channel allocating the transmitted data. This channel modeling is well suited to channels varying very slightly over the received block, that is to say for low $B_d \times T_m$ products. However, as soon as the channel becomes more selective, the planar modeling shows its limits and performance is reduced.

The third method is another form of MMSE with a non-constant plane being looked for. This method is therefore better suited to cases where the channel varies slowly, but is less suitable than the second method in the case of channels that are almost constant.

These three methods are suited to highly specific propagation cases, but are in no way suitable for channels of the multi-path type that are selective in time and in frequency. The precise purpose of this invention is to remedy this disadvantage.

DESCRIPTION OF THE INVENTION

The main aim of this invention is to improve the performance of existing OFDM systems and those to come. This improvement, obtained by optimization of the channel estimation, permits the capacity of the system to be substantially increased. This improvement is brought about by optimization of the operation of the OFDM receiver in the case of slow fading and also in the more complex case of very rapid fading.

It is then possible to prevent the reduction in performance brought about by rapid channel variation over the time-frequency block being considered on reception.

At constant reception quality, the invention enables one to reduce the relative number of and/or the power of the pilot symbols. This aim is achieved by taking into consideration, in an optimum manner, an arbitrary number of pilot symbols from consecutive time-frequency blocks, in the channel estimation. The aim is also achieved by the optimum character, in the channel estimation, of the consideration (of one part or of the totality) of the data symbols of these blocks, which are of course more numerous than the pilot symbols.

The invention may also be used whatever the way in which the pilot symbols are inserted into the stream of transmitted information.

The receiver of the invention carries out a block by block processing every time a given number of OFDM symbols is available. On each branch of diversity, first of all, the multi-path channel is roughly estimated using the pilot symbols associated with the received block and possibly with other blocks. The purpose of this estimation is initialization of the iterative channel estimation algorithm. Next, all of the symbols (data and pilot) are processed to obtain the channel estimation which permits generation of flexible outputs of the transmitted data symbols. The flexible outputs obtained at the end of an iteration can be used once again, in conjunction with the pilot symbols, to provide a extra improvement in the channel estimation, and therefore to further improve the flexible estimations of the data symbols.

In addition, the proposed technique enables one to take into account the coded structure of the data symbols and may be optimized in this sense, which leads to the production of flexible outputs of better quality.

The estimation of the multi-path channel rests, on the one hand on the use of the iterative algorithm called Expectation Maximization or E.M. [5], [6], [7] to find the most probable channel implementation conditional on the received block to be processed and on the coding of the channel possibly being used. It also rests on the decomposition of the bi-dimensional multi-path channel onto each branch of diversity in accordance with the Karhunen-Loève expansion theorem [8]. This decomposition permits flexible characterization of the temporal variations of the paths due to the Doppler effect and frequency variations due to temporal spreading and is easily integrated into the E.M. algorithm itself.

More precisely, a subject of this invention is a receiver for radio communications with Orthogonal Frequency Division Multiplexing (OFDM) comprising:

i) a plurality of L branches of diversity processing blocks of digital symbols, each block comprising data symbols and pilot symbols distributed within a bi-dimensional time-frequency block at $N_t$ intervals of time and $N_f$ intervals of frequency, each branch of diversity comprising a radio sensor, means supplying an output signal with N components constituting the components of a vector $R^l$, where l designates the row of the branch of diversity (l ranging from 0 to L−1), ii) a channel estimator processing the L signals supplied by the L branches of diversity and supplying flexible estimations of the data symbols, iii) a decision making device receiving the flexible estimations of the data symbols and supplying an estimation of the data symbols, this receiver being characterized in that (a) the channel estimator processes a vector $C^l$ with N components characterizing the channel in a bi-dimensional time-frequency block, these means of estimation being capable of defining a base of N vectors $B_k$ which are the N eigenvectors standardized from the time-frequency covariance matrix of the channel, these means breaking down each vector $C^l$ in this base, the N coefficients from this decomposition being designated $G_k^l$ with k ranging from 0 to N−1, the coefficients defining, for each branch of diversity l, a vector $G^l$, which is a representation of the channel seen at the output from said branch of diversity.

(b) the channel estimator processes a finite number (D) of iterations in accordance with an estimation-maximization (EM) algorithm based on the criterion of maximum probability a posteriori (MAP), the means of estimation initially being implemented by taking into consideration the pilot symbols contained in the bi-dimensional time-frequency block being considered and possibly the pilot symbols contained in the neighboring time-frequency blocks, which leads to a 0 order estimation, the channel estimator then taking into consideration the data symbols for the other iterations and so on, the channel estimator finally supplying after a final iteration D, the optimum coefficients $G_k^{l(D)}$ (k from 0 to (N−1) and l from 0 to L−1), defining each branch of diversity l, the vector $G^l$ representing the channel.

In one particular embodiment $N_t=N_f$ and the time-frequency blocks are square.

Another subject of this invention is a reception method for which the operations correspond to the functions fulfilled by the various means of the receiver which has just been described.

DETAILED DESCRIPTION OF PARTICULAR EMBODIMENTS

Figure 1:
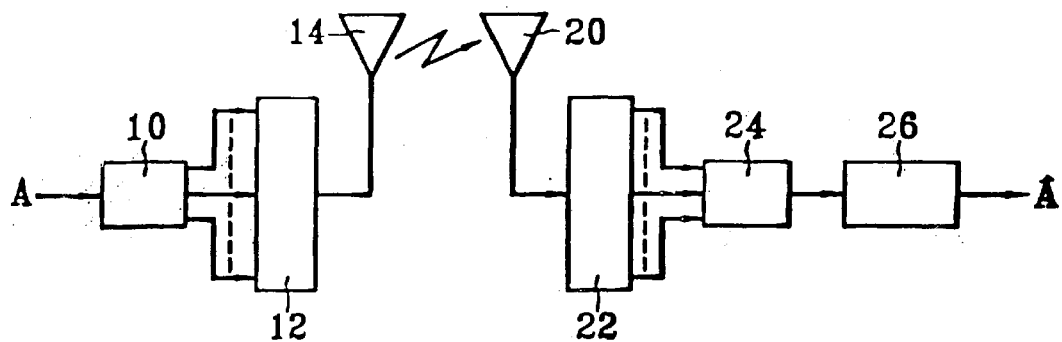
FIG. 1, already described, shows a traditional OFDM transmission chain with a single sensor FIG. 2, already described, shows a traditional OFDM receiver with several sensors and L branches of diversity.
Figure 2:
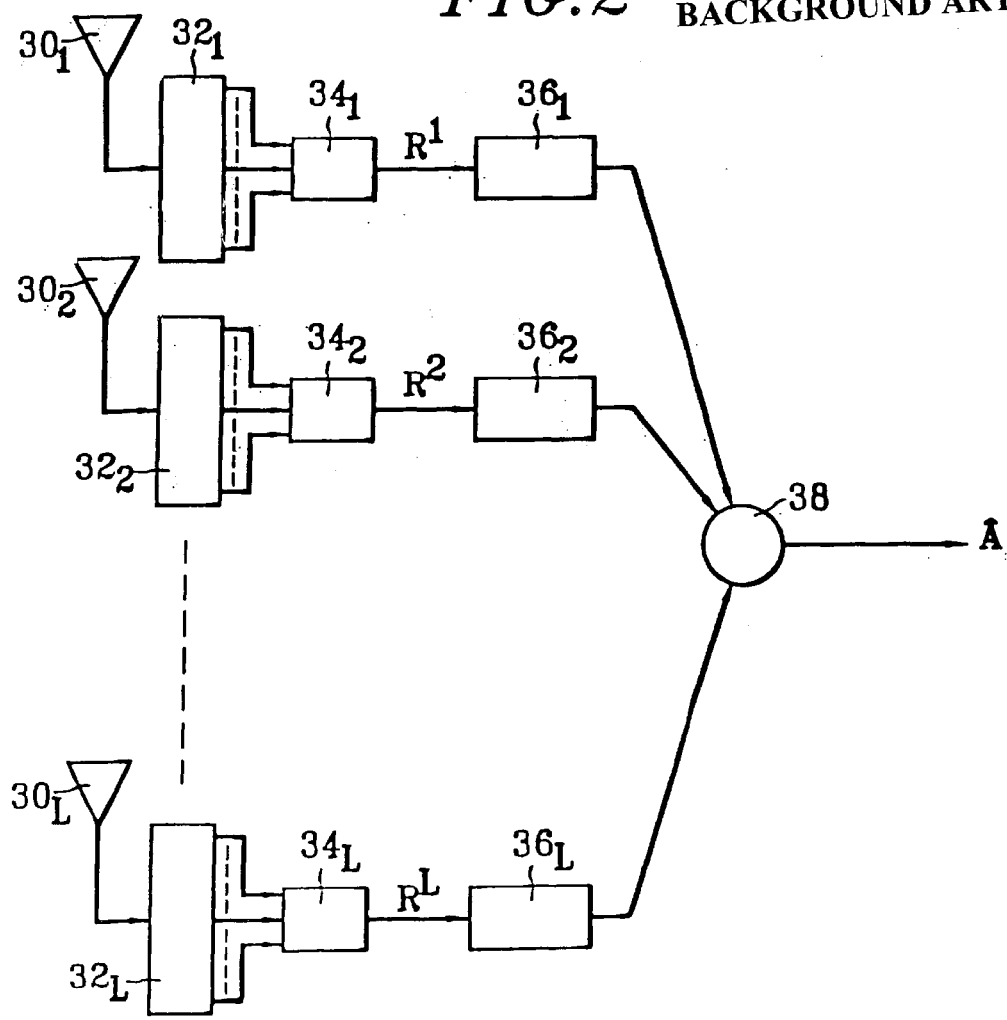
Figure 3:
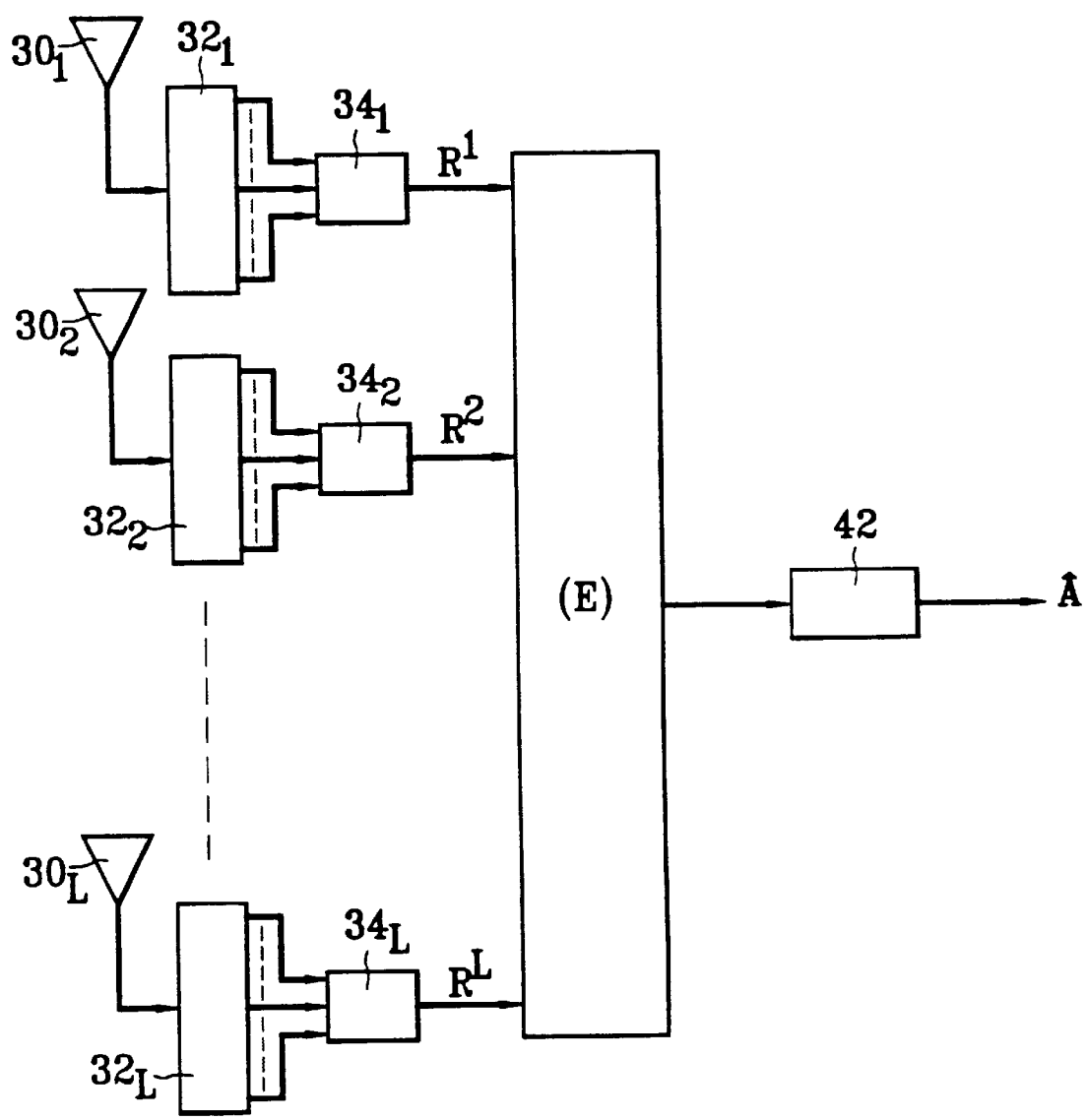
FIG. 3 illustrates a receiver conforming to the invention.

A receiver conforming to the invention is represented diagrammatically in FIG. 3. This receiver comprises means already shown in FIG. 2 and which bear the same reference numbers. However the receiver comprises means to implement an iterative estimation algorithm which is diagrammatically shown by the block (E) which supplies the decision device 42.

The elementary entity of the OFDM signal corresponds to the inverse Fourier transform of a sequence of symbols. The receiver of the invention processes the received signal block by block. The size of the processed block does not necessarily depend on the number of carriers of the OFDM system and may take into consideration all or a part of one or more OFDM symbols. The shape and the size of the block processed on reception is free, so that it may be best matched to the system.

The channel estimation is carried out block by block. A block is made up of N symbols $a_{mn}$ of energy $E_{mn}$ of bi-dimensional location (mF, nT) where F and T are the relative frequency and time spacings between two adjacent symbols. These symbols take their values in an alphabet $\Omega$ of the arbitrary phase shift keying (PSK) type. Each block is made up of $N_D$ indexed data symbols in the assembly $S_D$ and $N_P$ indexed pilot symbols in the assembly $S_P$.

As a general rule, the traditional receivers use pilot symbols of greater power than the data symbols. This difference in power permits one to estimate the channel in the best way, but risks the introduction of interference between carriers and hence a reduction in the capacity of the OFDM system. The technique of channel estimation according to the invention enables one to carry out an optimum channel estimation whatever the value of the power of the pilot symbols. In what follows, $E_P$ designates the energy of the pilot symbols and $E_D$ the energy of the data symbols.

The multi-path channel taken by the OFDM signal is made up of several paths which have or may have time and frequency variations due to the Doppler effect. Each path is characterized by a given mean power and a given Doppler Power Spectrum (DPS) which depend on the environment and the speed of the mobile. Furthermore, the fading to which each path is subjected can be either the Rayleigh type or the Rice type.

$J_0(.)$ denotes the first species, zero order Bessel function. By way of examples, the time-frequency auto-correlation function of the channel with a traditional Doppler power spectrum and with the exponential multi-path intensity profile of mean power $\phi(0,0)$ seen on a branch of diversity, is given by $$\phi(\Delta f, \Delta t) = \phi(0, 0) \frac{J_0(\pi B_d \Delta t)}{1 + j2\pi T_m \Delta f}$$

The multi-sensor OFDM receiver of the invention is made up of L sensors $30_1, 30_2, \ldots, 30_L$ spatially decorrelated, giving rise to L branches of diversity. On each of these branches, the received signal is, in the first place demodulated by the Fourier transform in the circuits $32_1, 32_2, \ldots,$ $32_L$. It is assumed that the signal at the output from the $l^{th}$ branch of diversity associated with the symbols $a_{mn}$ is written as $$R_{mn}^l = c_{mn}^l a_{mn}^l + N_{mn}^l$$

where $c_{mn}^l$ is the gain factor of the discrete channel from the $l^{th}$ branch of diversity seen by the symbol $a_{mn}$ and $N_{mn}^l$ is an additive complex white Gaussian noise of variance $N_0$. The gain factors are independent from one branch of diversity to another, but are correlated in time and in frequency between themselves on one and the same branch.

The purpose of the invention is to estimate the gain factors $c_{mn}^l$ of the channel.

Let $(.)^T$ be the transposition operator. For reasons of notation, the indexation function $\delta(k)=(m(k),n(k))$ is inserted between the mono-dimensional assembly $\{k\}_{k=0}^{N-1}$ and the bi-dimensional indexation assembly $S_D \cup S_P$. Furthermore, for every block transmitted, the vector signal is inserted at the output from the filter matched to the $l^{th}$ branch of diversity $$R^l = (R^l_{\delta(0)}, \ldots, R^l_{\delta(N-1)})^T$$

In order to remove the dependence of the amplitude of each PSK symbol $a_{mn}$ on its index (m, n), the normalized vector of the transmitted block is inserted:

$$A = (A_{\delta(0)}, \ldots, A_{\delta(N-1)})^T$$

with $A_{\delta(k)} = a_{\delta(k)}/|a_{\delta(k)}|$. On these bases, it is possible to rewrite the components of the received vector on the $l^{th}$ branch of diversity:

$$R_{\delta(k)}^l = C_{\delta(k)}^l A_{\delta(k)} + N_{\delta(k)}^l$$

where $C_{\delta(k)}^l$ is the $\delta(k)^{th}$ component of the equivalent multiplicative discrete channel vector on the $l^{th}$ branch:

$$C^l = (|a_{\delta(0)}|c_{\delta(0)}^l, \ldots, |a_{\delta(N-1)}|c_{\delta(N-1)}^l)^T$$

One is seeking to estimate the vector $C^l$ for each block and on each branch.

For the channel estimation, in accordance with the Maximum a Posteriori criterion, a suitable representation of the discrete multi-path channel is used for each branch of diversity. This representation is based on the Karhunen-Loève theorem of orthogonal decomposition. The vector representing the equivalent discrete multi-path channel on the $l^{th}$ branch of diversity $C^l$ is expressed in the following way:

$$C^l = \sum_{k=0}^{N-1} G_k^l B_k$$

where $\{B_k\}_{k=0}^{N-1}$ are the N normalized eigenvectors from the time-frequency auto-correlation matrix of the discrete channel and $F = E[C^l C^{l-T}]$ and $\{G_k^l\}_{k=0}^{N-1}$ are random complex Gaussian variables which are independent and centered and of variances equal to the eigenvalues $\{\Gamma_k\}_{k=0}^l$ of the hermitian matrix F. The $(p,q)^{th}$ entry of the matrix F is given by $$F_{pq} = \sqrt{E_{\delta(p)} E_{\delta(q)}} \phi([m(p)-m(q)]F,[n(p)-n(q)]T)$$

The vectors $\{G^l\}_{l=0}^{L-1}$, with $G^l = (G_0^l, \ldots G_{0N-1}^l)^T$ are suitable representation of the discrete multiplicative channel seen at the output from the L branches of diversity.

The estimation of the channel therefore comes down to estimating $\{G_k^l\}_{k=0, l=0}^{N-1, L-1}$. This estimation is made iteratively by the following formula by designating $G_p^{l(d)}$ the estimation of $G_p^l$ at the $d^{th}$ iteration of the algorithm:

$$G_p^{l(d+1)} = w_p \sum_{k=0}^{N-1} \left( R_{\delta(k)}^l \left( \sum_{A \in \Omega} AP\left(A_{\delta(k)} = A \mid \{R^l\}_{l=0}^{L-1}, \{G^{l(d)}\}_{l=0}^{L-1}\right)\right)\right)^* B_{p\delta(k)}^*$$

where $B_{p\delta(k)}$ is the $k^{th}$ component of $B_p$ and $$w_p = \frac{1}{1 + N_0/\Gamma_p}$$

The encoding is not taken into consideration in this formula. With regard to this, if a part of the transmitted vector A is encoded by any code (convolute, en bloc etc.) and then on each iteration of the EM algorithm, the conditional discrete probabilities $P(A_{\delta(k)}=A|\{R^l\}_{l=0}^{L-1},\{G^{l(d)}\}_{l=0}^{L-1})$ can be calculated exactly by using the trellis of this code and the Bahl algorithm [9]. The initialization of the algorithm is carried out by the projection of the received pilot symbols onto the N eigenvectors $\{B_k\}_{k=0}^{N-1}$ of the correlation matrix F.

Therefore the equation $$G_p^{l(0)} = w_p \sum_{\delta(k) \in S_p} R_{\delta(k)}^l D_{\delta(k)}^* B_{p\delta(k)}^*$$

is used as the $p^{th}$ component of the initial estimation $G^{l(0)}$.

The vectors $\{B_k\}_{k=0}^{N-1}$ are known elements at the receiver. They correspond to a chosen channel model. This family of vectors is obtained by calculating the theoretical correlation matrix F of, the corresponding model and by deriving from this these eigenvectors $\{B_k\}_{k=0}^{N-1}$ and its associated eigenvalues $\{\Gamma_k\}_{k=0}^{N-1}$.

The recombination of the L branches that enable one to benefit from the spatial diversity of the receiver is carried out during the iterative processing of the probabilities $P(A_{\delta(k)}=A|\{R^l\}_{l=0}^{L-1},\{G^{l(d)}\}_{l=0}^{L-1})$. After a chosen number D of iterations of the algorithm, the probabilities $P(A_{\delta(k)}=A|\{R^l\}_{l=0}^{L-1},\{G^{l(d)}\}_{l=0}^{L-1})$ enable one to obtain a flexible estimation of the data symbols. The decision is made by processing these flexible outputs either directly by a decision device if the data are not encoded or through a decoder if the data are encoded.

Figure 4:
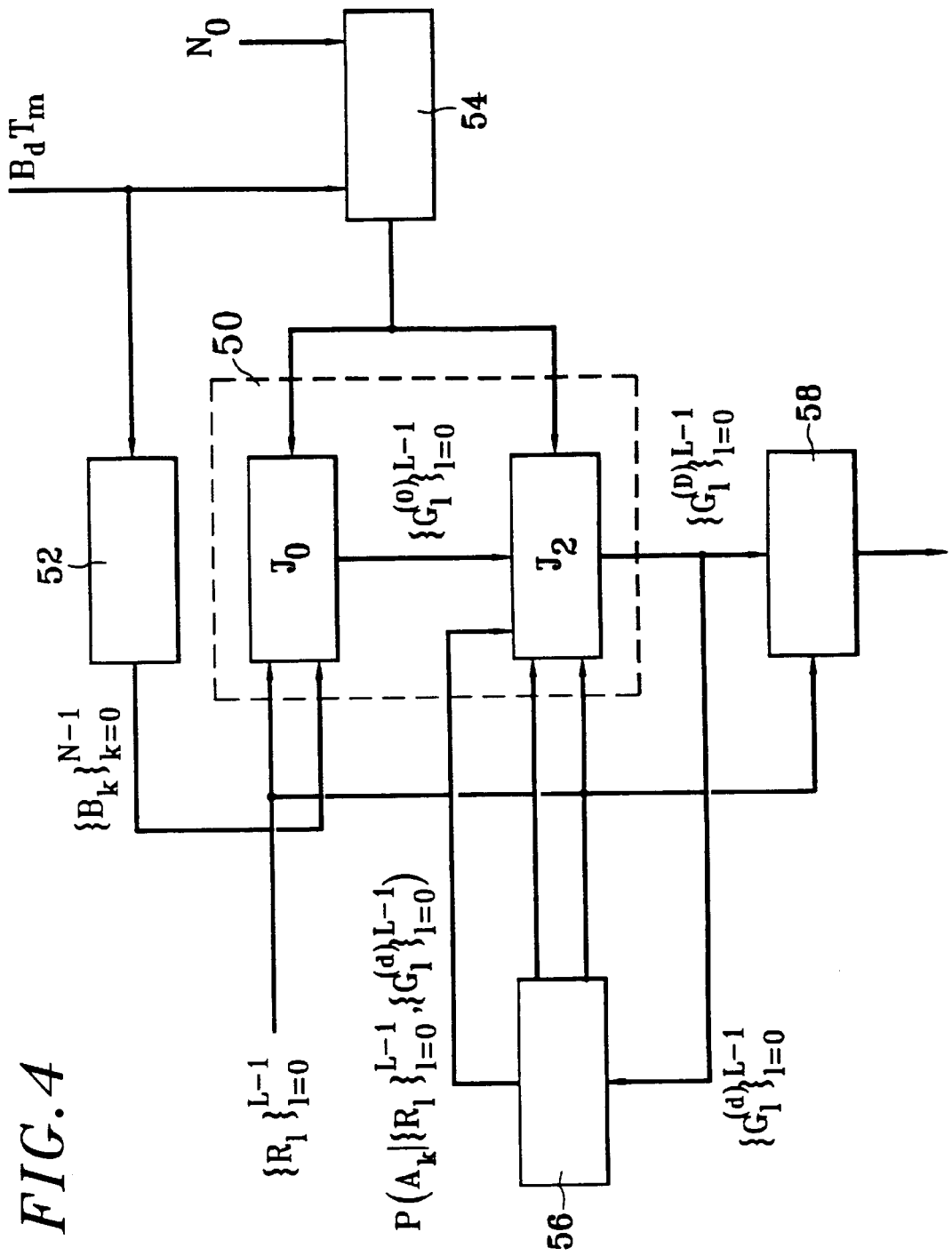
FIG. 4 illustrates the process of iterative estimation according to the invention.

The improved channel estimation algorithm according to the invention is illustrated in FIG. 4. The algorithm E.M. is symbolized by the block 50, the selection of the suitable base by the block 52 which receives the product $B_dT_m$ and the calculation of the weightings by the block 54 which receives $B_dT_m$ and $N_0$. The algorithm: E.M. of the block 50 is iterative and comprises an initialization represented diagrammatically by the block $\Im_0$ and D iterations $\Im_d$. The demodulation is represented by the block 58 which supplies the probabilities $P(A \in \Omega|\{R^l\}_{l=0}^{L-1},\{G^{l(d)}\}_{l=0}^{L-1})$.

Figure 5:
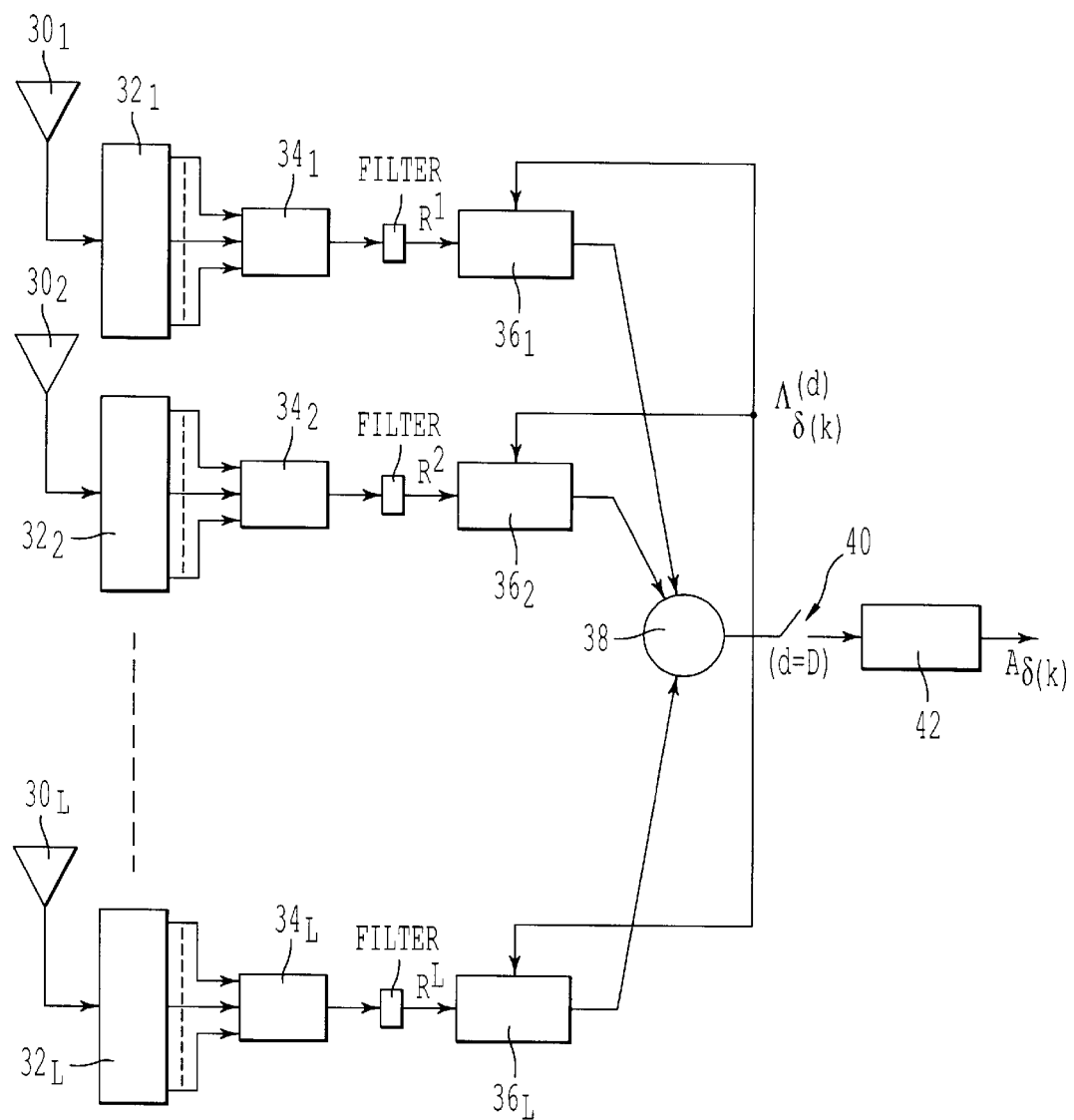
FIG. 5 illustrates a particular embodiment of the receiver of the invention.

A receiver conforming to the general description of the invention is shown diagrammatically in FIG. 5. This receiver comprises means already shown in FIG. 2 and which bear the same reference numbers. However the receiver comprises means to implement an iterative estimation algorithm which is shown on the diagram by the looping of the output from the adder 38 onto the estimation means, 36$_l$, . . . , 36$_L$. By this looping, a signal designated $\Lambda_{\delta(k)}^{(d)}$ where d represents the row of the iteration, is applied to these means. The receiver shown additionally comprises a symbol switch 40 which closes on the final iteration D in order to power the decision device 42.

It is assumed, in this particular embodiment that the received OFDM signal is made up of symbols which take their values in an alphabet $\Omega$ of the phase shift keying type with 2 or 4 states. The other characteristics of the received signal such as the shape of the blocks, their size, the distribution and the power of the pilot symbols, as well as the characteristics of the channel are the same as in the general case previously described.

The assumption made in this particular case enables one to obtain an analytic expression of the estimation $G_p^{l(d+1)}$. In the case where the symbols come from a constellation of the PSK-2 type, the $G_p^{l(d+1)}$ expression is as follows:

$$G_p^{l(d+1)} = w_p \left( \sum_{\delta(k) \in S_D} R_{\delta(k)}^1 \tanh[2 \, Re\{\Lambda_{\delta(k)}^1\}] B_{p\delta(k)}^* + \sum_{\delta(k) \in S_D} R_{\delta(k)}^1 D_{\delta(k)}^* B_{p\delta(k)}^* \right)$$

In the case where the symbols come from a constellation of the PSK-4 type, the $G_p^{l(d+1)}$ expression is as follows:

$$G_p^{l(d+1)} =$$

$$w_p \sum_{\delta(k) \in S_D} \left( R_{\delta(k)}^1 \left[ \frac{1}{\sqrt{2}} \tanh\left[\sqrt{2} \, Re\{\Lambda_{\delta(k)}^1\}\right] + \frac{j}{\sqrt{2}} \tanh\left[\sqrt{2} \, Im\{\Lambda_{\delta(k)}^1\}\right] \right] \right)^*$$

$$B_{p\delta(k)}^* + \sum_{\delta(k) \in S_D} R_{\delta(k)}^1 D_{\delta(k)}^* B_{p\delta(k)}^*$$

where $D_{\delta(k)}$ is the value taken by the pilot symbol $A_{\delta(k)}$, $\delta(k) \in S_p$ and:

$$\Lambda_{\delta(k)}^d = \frac{1}{N_0} \sum_{l=0}^{L-1} R_{\delta(k)}^1 \left( \sum_{p=0}^{N-1} G_p^{l(d)*} B_{p\delta(k)}^* \right)$$

In this expression, the bracket represents the conjugated complex $C_{\delta(k)}^{l*}$ of the $\delta(k)^{th}$ component of the channel.

The recombination of the L branches that enables one to benefit from the diversity, on reception, of the receiver is carried out during the iterative processing of the variable $\Lambda_{\delta(k)}^{(d)}$. The decision is made either directly on this variable, if the data are not encoded, or through a decoder if the data are encoded, after a chosen number of iterations D of the algorithm. In addition, in the case of PSK-2 keying, the following variant can be used:

$$\hat{A}_{\delta(k)} = \text{sign}(\Lambda_{\delta(k)}^{(D)})$$

Figure 6:
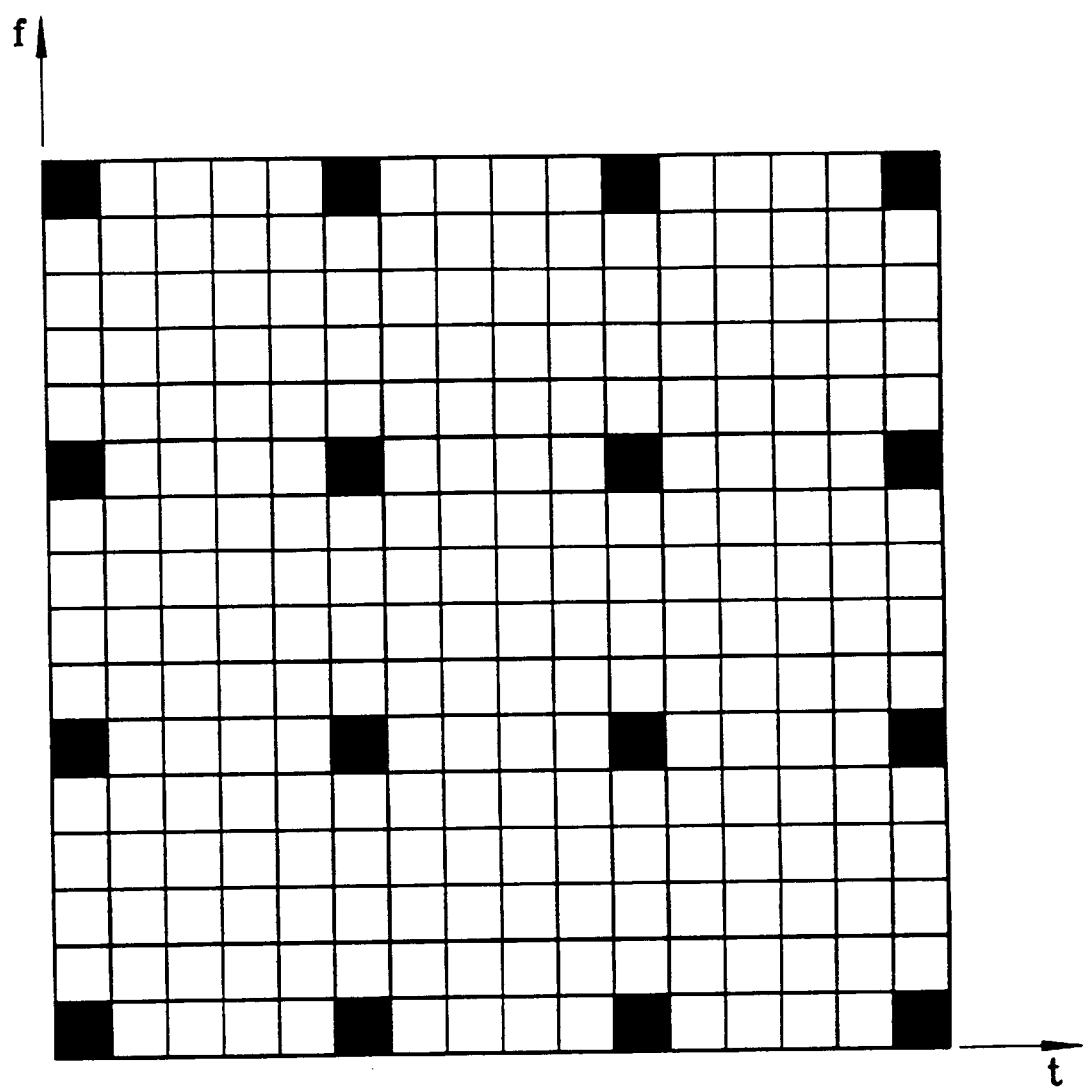
FIG. 6 shows an example of distribution of the pilot symbols and the data symbols in a time-frequency block.

The receiver and the method of the invention have been simulated by a multi-path channel with a product $B_d \times T_m$ equal to $10^{-5}$. The block processed by the receiver is a square containing 256 symbols, 16 symbols of which are pilot symbols. The pilot symbols are evenly distributed within each time-frequency block as illustrated in FIG. 6 where they are shown in the form of black squares, the white squares representing data symbols.

In the simulation, the receiver assumes that the channel has a constant power spectrum and a constant multi-path intensity profile. This time-frequency auto-correlation function is written therefore as:

$$\phi(\Delta f, \Delta t) = \phi(0, 0) \frac{\sin(\pi B_d \Delta t)}{\pi B_d \Delta t} \frac{\sin(\pi T_m \Delta f)}{\pi T_m \Delta f} e^{-j\pi T_m \Delta f}$$

Figure 7:
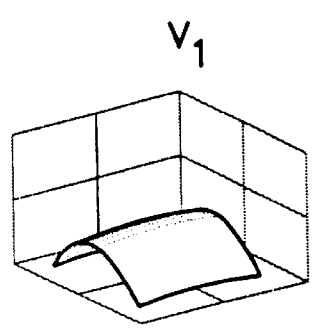
FIG. 7 is a representation of the eigenvectors of the correlation matrix of the channel with a traditional Doppler spectrum and an exponential multi-path intensity profile for $B_d T_m = 10^{-5}$.
Figure 7:
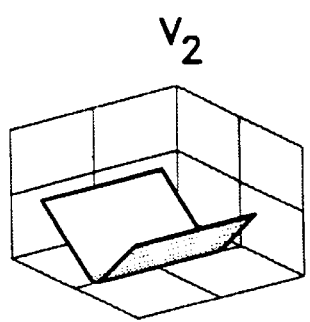
Figure 7:
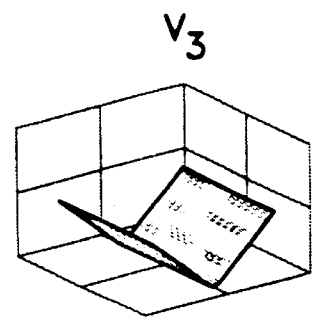
Figure 7:
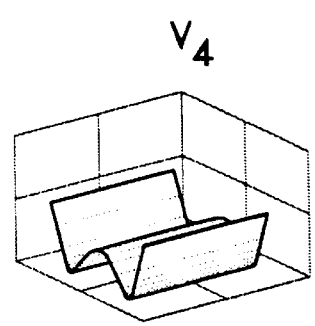
Figure 7:
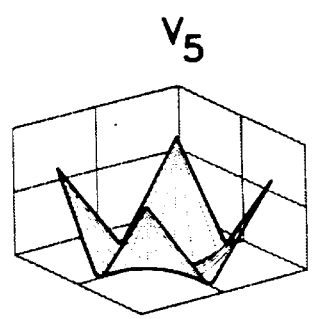
Figure 7:
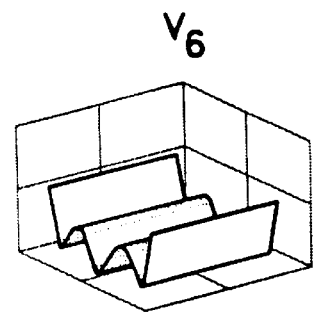
Figure 7:
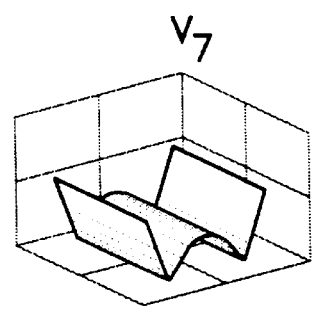
Figure 7:
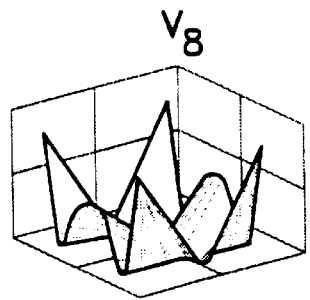
Figure 7:
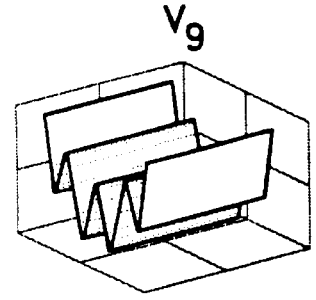

It is possible to use the eigenvectors coming from an arbitrary channel model. For example, a channel model with a Doppler power spectrum and an exponential multi-path intensity profile is illustrated by FIGS. 6 and 7. These Figures represent eigenvectors from the correlation matrix of the channel with a traditional Doppler spectrum and an exponential multi-path intensity profile for respectively $B_d T_m = 10^{-5}$ (FIG. 6) and $B_d T_m = 10^{-3}$ (FIG. 7).

Figure 8:
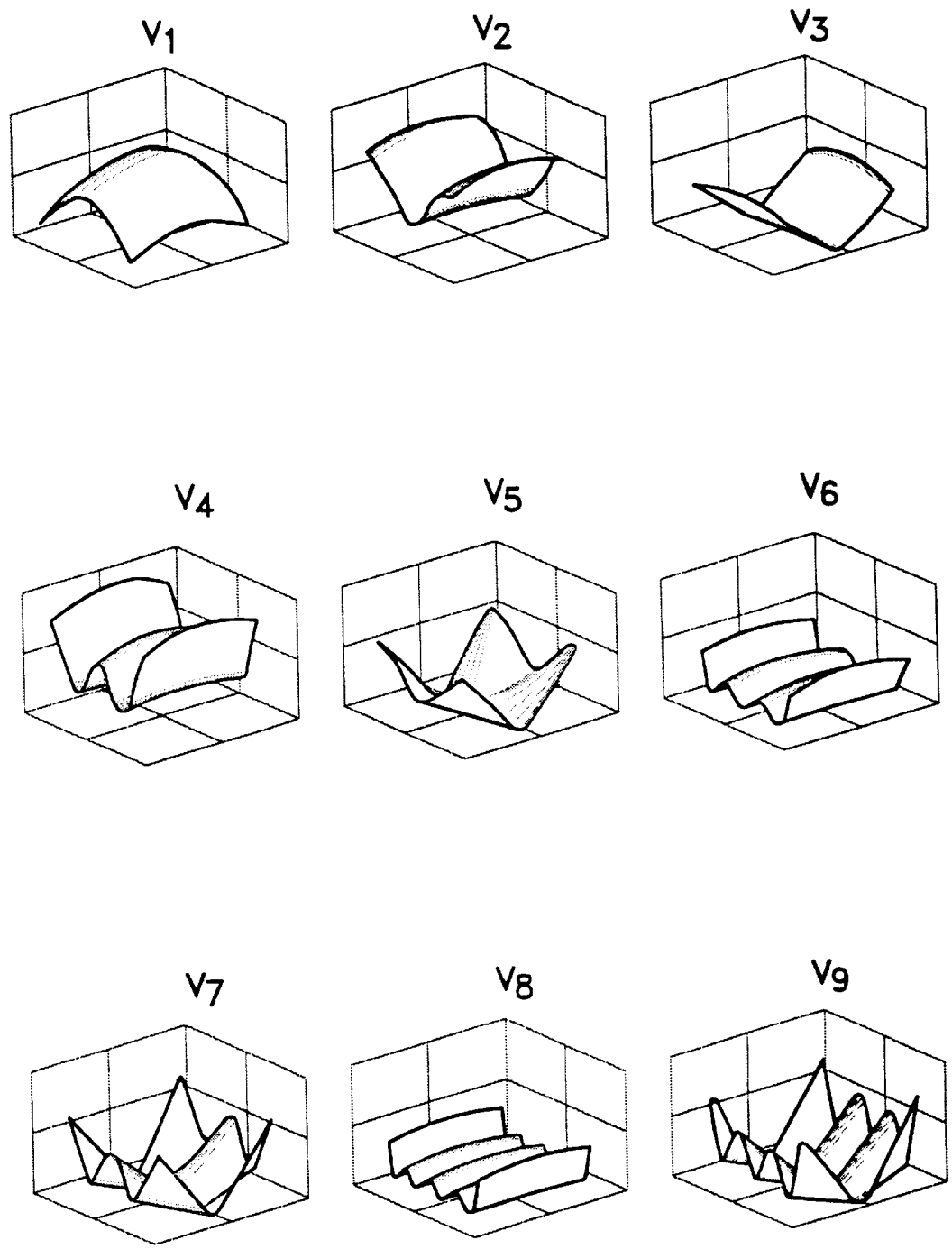
FIG. 8 is a representation of the same eigenvectors but for $B_d T_m = 10^{-3}$.
Figure 9:
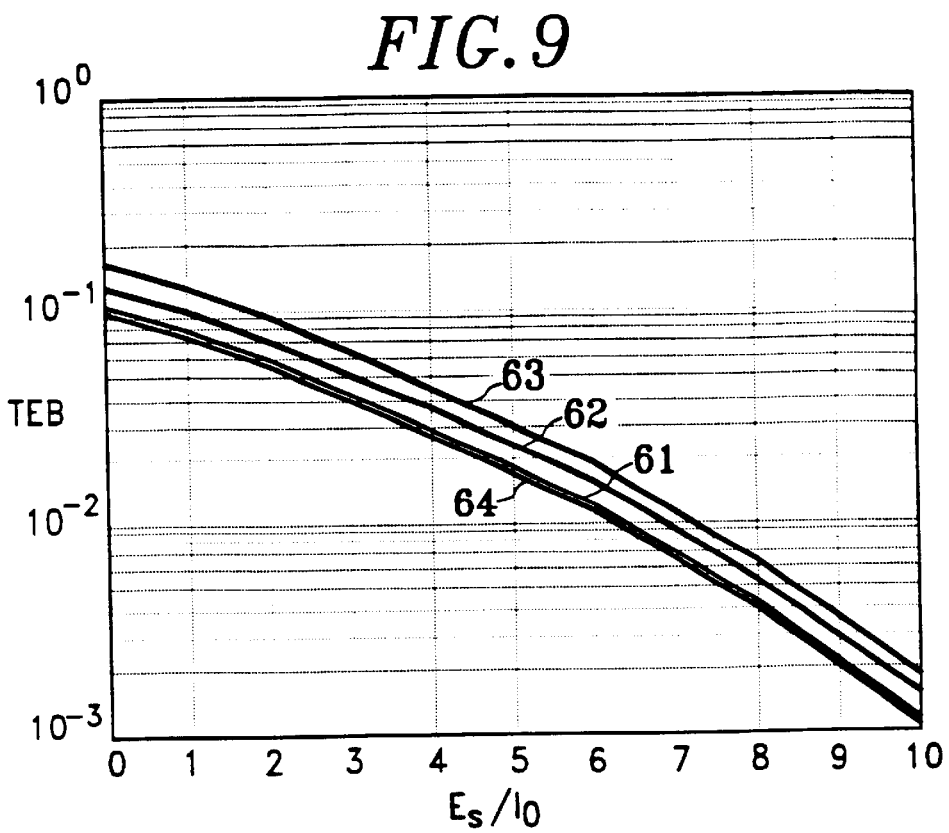
FIG. 9 gives variations in the binary error rate (BER) in relation to the ratio $E_s/I_o$ for a receiver conforming to the invention and for various traditional receivers in the case of a product $B_dT_m$ equal to $10^{-5}$ with 16 pilot symbols distributed as indicated in FIG. 5.
Figure 10:
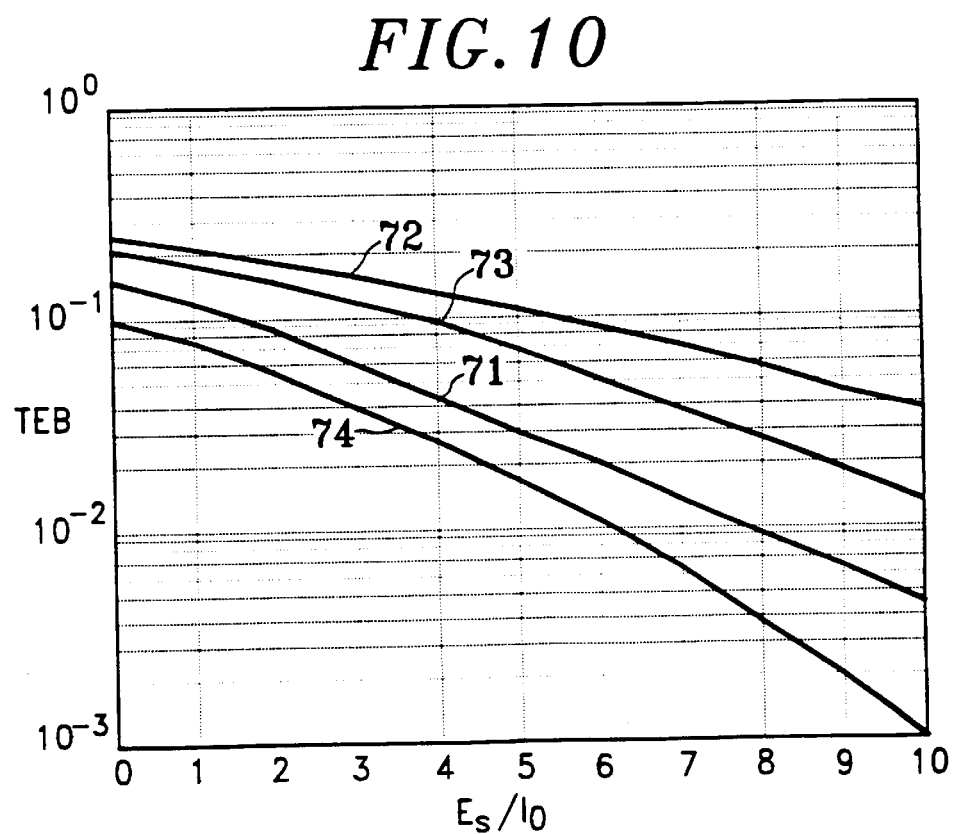
FIG. 10 gives these same variations but for a product $B_dT_m$ equal to $10^{-3}$.

In order to illustrate the advantages of the invention, FIGS. 8 and 9 compare the performance of a receiver according to the invention with those of a traditional receiver of the MMSE type. These Figures give the Binary Error Rate BER as a function of the signal to noise ratio $E_s/I_o$. In both cases, the pilot symbols are assumed to be evenly distributed as illustrated in FIG. 5. For FIG. 8, the product $B_d T_m$ equals $10^{-5}$ and it equals $10^{-3}$ for FIG. 9. The four curves in these Figures correspond respectively to:

61, 71: estimator according to the invention
62, 72: estimator with constant MLSE
63, 73: estimator with MLSE
64, 74: theoretical limit curve It can be seen that in both cases, the invention leads to better performance than with the traditional technology.

By way of example, for a crude BER of $10^{-2}$, the use of the invention guarantees an improvement in terms of signal to noise ratio of 3 dB with respect to the best traditional receivers in the case of a dispersion channel with $B_d \times T_m = 10^{-3}$.

References

[1] J. A. C. Bingham "Multicarrier modulation for data transmissions: an idea whose time has come", IEEE Communication Magazine, 28(5) 5–14, May 1990.
[2] "Digital Broadcasting Systems for Television, Sound and Data Services", European Telecommunication Standard, prETS 300 744 (Draft Version 0.0.3), April 1996.
[3] "Radio Broadcasting Systems; Digital Audio Broadcasting (DAB) to Mobile, Portable and Fixed Receivers", ETS 300 401, ETSI, European Telecommunication Institute, Valbonne, France, February 1995.
[4} EP-0 802 656, "Signal numérique à blocs de référence multiples pour l'estimation de canal, procédés d'estimation de canal et récepteurs correspondents" ("Digital signal with multiple reference blocks for channel estimation, channel estimation methods and corresponding receivers")
[5] A. P. Dempster, N. M. Laird and D. B. Rubin "Maximum Likelihood from Incomplete Data via the EM algorithm", Journal of the Royal Statistical Society, 39, 1977.
[6] G. K. Kaleh, "Joint Carrier Phase Estimation and Symbol Decoding of Trellis Codes", European Transactions on Telecommunications and Related Technologies, San Diego, Calif. January 1990.
[7] C. N. Georghiades and J. C. Han: "Sequence Estimation in the Presence of Random Parameters via the EM Algorithm", IEEE Transactions on Communications, 45, No. 3, March 1997.
[8] J. G. Proakis: Digital Communications, McGraw-Hill, N.Y. 1989.
[9] L. R. Bahl, J. Cocke, F. Jelinek and J. Raviv: "Optimal decoding of linear codes for minimizing symbol error rate", IEEE Transactions on Information Theory, 20, March 1974.

What is claimed is:

1. An Orthogonal Frequency Division Multiplexing (OFDM) receiver for receiving a signal representing data symbols transmitted through a plurality of channels and for supplying an estimation ($\hat{A}$) of the data symbols comprising:

a plurality of branches of diversity processing blocks of digital symbols, each block comprising data and pilot symbols distributed within a bi-dimensional time-frequency block at $N_t$ intervals of time and $N_f$ intervals of frequency, each branch of diversity comprising a radio sensor supplying an output signal with N components comprising the components of a vector $R^l$ where l designates a row of the branch of diversity, l ranging from 0 to (L−1), a channel estimator configured to receive the output signals supplied by the branches of diversity to process the output signals, and to supply flexible estimations of the data symbols, a decision making device configured to receive the flexible estimations of the data symbols and to supply the estimation ($\hat{A}$) of the data symbols, wherein:

the channel estimator processes a vector $C^l$ with N components characterizing an estimated channel for each bi-dimensional time-frequency block; said channel estimator configured to define a base of N vectors $B_k$ which are N eigenvectors standardized from a time-frequency covariance matrix of the estimated channel; said channel estimator decomposing each vector $C^l$ in this base giving N coefficients; the N coefficients from this decomposition being designated $G_k^l$ with k ranging from 0 to N−1; the coefficients $G_k^l$ defining, for each branch of diversity l, a vector $G^l$, which is a representation of the estimated channel at an output from said branch of diversity, said channel estimator processes a finite number of iterations in accordance with an expectation-maximization (EM) algorithm based on a criterion of maximum probability a posterior; the estimator initially being implemented by taking into consideration the pilot symbols contained in the bi-dimensional time-frequency block being considered, which leads to a zero ($0^{th}$) order estimation; the channel estimator then taking into consideration the pilot and precedent flexible data symbols estimated for a next iteration up to a final iteration, when the finite number of iterations is reached; the channel estimator supplying, after said final iteration, the optimum coefficients $G_k^{l(D)}$, k from 0 to N−1, and l from 0 to L−1, defining each branch of diversity; the vector $G^l$ representing the estimated channel.

2. Receiver according to claim 1, in which the channel estimator is configured to calculate a flexible estimation of the data symbols calculated from probabilities $P(A_{\delta(k)} = A | \{R^l\}_{l=0}^{L-1}, \{G^{l(d)}\}_{l=0}^{L-1})$ obtained from a recombination of contributions from L branches of diversity, these contributions being equal to a product of components $R_{\delta(k)}^l$ of an output signal vector $R^l$ from a filter matched to each branch of diversity by a conjugated complex $C_{\delta(k)}^{l*}$ of the estimation of a $\delta(k)^{th}$ component of the channel obtained after the final iteration, where $\delta(k)$ is a bi-dimensional indexation function.

3. Receiver according to claim 2, in which said output signal is either processed directly by a decision device if data are not encoded or through a decoder if data are encoded, supplying the symbol ($\hat{A}$) finally supplied by the receiver.

4. Receiver according to claim 1, in which, in a bi-dimensional block, a number $N_t$ of intervals of time is equal to a number $N_f$ of intervals of frequency.

5. Reception method for radio communications with Orthogonal Frequency Division Multiplexing (OFDM) for receiving a signal representing data symbols transmitted through a plurality of paths and for supplying an estimation (Â) of the data symbols in which:

in a plurality of L branches of diversity blocks of digital symbols are processed, each block comprising data and pilot symbols distributed within a bi-dimensional time-frequency block with $N_t$ intervals of time and $N_f$ intervals of frequency; the signal in each branch of diversity is received by a radio sensor; an output signal is produced with N components constituting the components of a vector $R^l$, where l designates a row of the branch of diversity, l ranging from 0 to L, and a radio channel taken by the signal received in a bi-dimensional time-frequency block is estimated;

the signals supplied by the branches of diversity are recombined; and a decision is taken from a recombination signal and an estimation of the data symbols is supplied; wherein:

a estimated channel in each branch of diversity is estimated by processing a vector $C^l$ with N components characterizing the estimated channel in a bi-dimensional time-frequency block; a base is defined of N vectors $B_k$ which are N eigenvectors standardized from a time-frequency covariance matrix of the estimated channel; each vector $C^l$ in this base is decomposed giving N coefficients; the N coefficients from this decomposition being designated $G_k^l$ with k ranging from 0 to N−1, the coefficients $G_k^l$ defining, for each branch of diversity l, a vector $G^l$, which is a representation of the estimated channel at an output from said branch of diversity;

to carry out an estimated channel estimation, a finite number of iterations is made in accordance with an expectation-maximization (EM) algorithm based on a criterion of maximum probability a posteriori; the iterations are initialized by taking into consideration the pilot symbols contained in a bi-dimensional time-frequency block being considered, which leads to a zero ($0^{th}$) order estimation, then taking into consideration pilot and precedent flexible data symbols for a next iteration up to a final iteration when the finite number of iterations is reached; said final iteration providing optimum coefficients $G_k^{l(D)}$, k from 0 to N−1, and l from 0 to L−1; defining for each branch of diversity, the vector $G^l$ representing the estimated channel.

6. Method according to claim 5, in which, to carry out the recombination, a variable $\Lambda_{\delta(k)}^{(D)}$ is calculated by summing contributions from the L branches of diversity, these contributions being equal to a product of components $R_{\delta(k)}^l$ of an output vector signal $R^l$ from a filter matched to the branch of diversity being considered by a conjugated complex $C_{67(k)}^{l*}$ of a $\delta(k)^{th}$ component of a channel obtained after the final iteration, where $\delta(k)$ is a bi-dimensional indexation function.

7. Method according to claim 6, in which a variable $\Lambda_{\delta(k)}^{(D)}$ is processed either by a decision device if data are not encoded or through a decoder if data are encoded, supplying the finally estimated symbols ($\hat{A}_{\delta(k)}$) supplied by a receiver.

8. Method according to claim 5, in which a sign of the variable $\Lambda_{\delta(k)}^{(D)}$ is determined, said sign constitutes an estimated symbol ($\hat{A}_{\delta(k)}$) that is finally supplied.

9. Method according to claim 5, in which within a bi-dimensional block, a number ($N_t$) of intervals of time is equal to a number ($N_f$) of intervals of frequency.

10. An orthogonal frequency division multiplexing (OFDM) receiver for receiving a signal representing data transmitted through a plurality of channels and for supplying an estimation (Â) of the data, the receiver comprising:

a plurality of branches configured to process a plurality of blocks of digital signals;

each of the plurality of blocks including data and pilot signals distributed within a bi-dimensional time-frequency block at a time interval and a frequency interval;

each of the plurality of branches including a radio sensor configured to supply an output signal having N components of a vector $R^l$, wherein l refers to a row of a branch, and ranges from 0 to L−1;

a channel estimator configured to receive output signals from the plurality of branches and to process the output signals to supply flexible estimations of the data;

a decision making device configured to receive the flexible estimations and to supply the estimation (Â) of the data; wherein:

the channel estimator is configured to process a vector $C^l$ having N components indicating an estimated channel for each bi-dimensional time-frequency block, said channel estimator is configured to supply a vector $G^l$ which is an estimated channel at an output of each of the plurality of branches.

$G^l$ includes $G_k^l$ coefficients defining each of the plurality of branches, with k ranging from 0 to N−1, $G_k^l$ is calculated by a decomposition using a base of N vectors $B_k$, which are eigenvectors standardized from a time-frequency covariance matrix of the estimated channel, said channel estimator is configured to process a finite number of iterations according to an expectation-maximization algorithm based on a criterion of maximum probability a posteriori to supply $G^l$ including optimum coefficients $G_k^{l(D)}$, and said channel estimator is configured to supply a zero order estimation based on signals of the bi-dimensional time-frequency block and to perform further iterations based on the pilot signals and precedent flexible data signals until a specified number of iterations is reached supplying the optimum coefficients $G_k^{l(D)}$, with k ranging from 0 to N−1.

11. The receiver according to claim 10, wherein said channel estimator is configured to calculate a flexible estimation of the data signals calculated from probabilities $P(A_{\delta(k)}) = \Lambda | \{R^l\}_{l=0}^{L-1}, \{G^{l(d)}\}_{l=0}^{L-1}$ obtained from a recombination of contributions from the plurality of branches, the contributions are equal to a product of components $R_{\delta(k)}^l$ of the output signal having N components of the vector $R^l$ from a filter matched to each of the plurilty of branches by a conjugated complex $C_{\delta(k)}^{l*}$ of an estimation of a $\delta(k)^{th}$ component of a channel obtained after the final iteration, where k is a bi-dimensional indexation function.

12. The receiver according to claim 10, wherein said flexible estimation of data signals is processed directly by the decision making device if the data are not encoded or processed using a decoder if the data are encoded.

13. The receiver according to claim 10, wherein the bi-dimensional time-frequency block includes an equal number of time intervals and frequency intervals.

14. A reception method for radio communications with Orthogonal Frequency Division Multiplexing (OFDM) for receiving a signal representing data signals transmitted through a plurality of branches and supplying an estimation (Â) of the data signals, comprising:

processing a plurality of blocks of digital signals of the plurality of branches, each of the plurality of blocks including data and pilot signals distributed within a bi-dimensional time-frequency block at a time interval and a frequency interval;

receiving the signal of each of the plurality of branches with a radio sensor;

producing an output with N components of a vector $R^l$, where l designates a row of each of the plurality of branches, with l ranging from 0 to L−1;

estimating a radio channel by a signal received in a bi-dimensional time-frequency block, by recombining signals supplied by the plurality of branches; and supplying an estimation of the data according to a decision based on a recombination signal, wherein a channel estimator is configured to process a vector $C^l$ having N components indicating an estimated channel for each bi-dimensional time-frequency block, said channel estimator is configured to supply a vector $G^l$ which is an estimated channel at an output of each of the plurality of branches, $G^l$ includes $G_k^l$ coefficients defining each of the plurality of branches, with k ranging from 0 to N−1, $G_k^l$ is calculated by a decomposition using a base of N vectors, $B_k$, which are eigenvectors standardized from a time-frequency covariance matrix of the estimated channel, said channel estimator is configured to process a finite number of iterations according to an expectation-maximization algorithm based on a criterion of maximum probability a posteriori to supply $G^l$ including optimum coefficients $G_k^{(D)}$, and said channel estimator is configured to supply a zero order estimation based on signals of the bi-dimensional time-frequency block and to perform further iterations based on the pilot signals and precedent flexible data signals until a specified number of iterations is reached supplying the optimum coefficients $G_k^{l(D)}$, with k ranging from 0 to N−1.

15. The method according to claim 14 in which a variable $\Lambda_{\delta(k)}^{(D)}$ is calculated by summing contributions for the plurality of branches, wherein the contributions are equal to a product of components $R_{\delta(k)}^l$ of an output signal having N components of the vector $R^l$ from a filter matched to each of the plurality of branches by the conjugated complex $C_{\delta(k)}^{l*}$ of an estimation of a $\delta(k)^{th}$ component of a channel obtained after the final iteration, where k is a bi-dimensional indexation function.

16. The method according to claim 15, supplying the signal (Â) wherein, a variable $\Lambda_{\delta(k)}^{(D)}$ is either processed directly by a decision making device if the data are not encoded or processed using a decoder if the data are encoded.

17. The method according to claim 14, wherein a sign of a variable $\Lambda_{\delta(k)}^{(D)}$ is determined, wherein said sign constitutes the estimation (Â).

18. The method according to claim 14, wherein the bi-dimensional time-frequency block includes an equal number time intervals and frequency intervals.

* * * * *